United States Patent
Huang

(10) Patent No.: US 7,768,804 B2
(45) Date of Patent: Aug. 3, 2010

(54) INVERTER AND METHOD FOR CONTROLLING OUTPUT FREQUENCY OF INVERTER

(75) Inventor: Chang-Xin Huang, Taipei (TW)

(73) Assignee: Chunghwa Picture Tubes, Ltd., Bade, Taoyuan (TW)

( * ) Notice: Subject to any disclaimer, the term of this patent is extended or adjusted under 35 U.S.C. 154(b) by 85 days.

(21) Appl. No.: 12/344,273

(22) Filed: Dec. 25, 2008

(65) Prior Publication Data

US 2009/0316449 A1 Dec. 24, 2009

(30) Foreign Application Priority Data

Jun. 20, 2008 (TW) ............................. 97123115 A

(51) Int. Cl.
*H02M 1/12* (2006.01)
(52) U.S. Cl. ..................................................... 363/41
(58) Field of Classification Search ................. 327/172; 363/41

See application file for complete search history.

(56) References Cited

U.S. PATENT DOCUMENTS 5,731,965 A * 3/1998 Cheng et al. ................... 363/41
6,417,833 B1   7/2002 Takemoto \* cited by examiner

*Primary Examiner*—Shawn Riley
(74) *Attorney, Agent, or Firm*—Winston Hsu

(57) ABSTRACT

An inverter includes a counter, a PWM generator, a central controller and a power converter. The counter is used for receiving a frame switch signal to generate a frame counting signal. The PWM generator is coupled to the counter, and is used to select a specific frequency among a plurality of predetermined frequencies according to the frame counting signal, and generate a modulated signal having the specific frequency. The central controller is coupled to the PWM generator, and is used to generate a processed signal according to the modulated signal. The power converter is coupled to the central controller, and is used to generate an output signal according to the processed signal.

12 Claims, 2 Drawing Sheets

INVERTER AND METHOD FOR CONTROLLING OUTPUT FREQUENCY OF INVERTER

BACKGROUND OF THE INVENTION

1. Field of the Invention

The present invention relates to a power converting mechanism, and more particularly, to an inverter capable of determining an output frequency of the inverter according to a frame switch signal and a method for controlling the output frequency of the inverter.

2. Description of the Prior Art

For a liquid crystal display (LCD) with a direct-light type backlight module, because lamps in the backlight module are driven by a high voltage signal (about 1000 volts), a so-called "waving" phenomenon occurs to displayed images due to electro-magnetic interference (EMI) generated by the lamps and an inverter. Generally, the "waving" phenomenon resembles several horizontal bands, and positions of the horizontal bands are related to an output frequency of the inverter (i.e., a driving frequency of the lamps). Therefore, if the inverter outputs a fixed output frequency, the horizontal bands occur at almost the same positions on the screen, and are easily sensed by the user. The fixed output frequency outputted from the prior art inverter therefore causes the quality of the displayed image to be degraded.

SUMMARY OF THE INVENTION

It is therefore an objective of the present invention to provide an inverter capable of determining an output frequency of the inverter according to a frame switch signal and a method for controlling the output frequency of the inverter.

According to one embodiment of the present invention, an inverter includes a counter, a PWM generator, a central controller and a power converter. The counter is used for receiving a frame switch signal to generate a frame counting signal. The PWM generator is coupled to the counter, and is used to select a specific frequency among a plurality of predetermined frequencies according to the frame counting signal, and generate a modulated signal having the specific frequency. The central controller is coupled to the PWM generator, and is used to generate a processed signal according to the modulated signal. The power converter is coupled to the central controller, and is used to generate an output signal according to the processed signal.

According to another embodiment of the present invention, a method for controlling an output frequency of an inverter includes: counting a frame switch signal to generate a frame counting signal; selecting a specific frequency among a plurality of predetermined frequencies according to the frame counting signal, and generating a modulated signal having the specific frequency; generating a processed signal according to the modulated signal; and performing power conversion to generate an output signal according to the processed signal.

According to the inverter and the method for controlling the output frequency of the inverter, the output frequency of the inverter is determined according to the frame switch signal, that is, the output frequency of the inverter varies with time. Therefore, when displaying several sequential frames, the positions of the horizontal bands corresponding to these frames are different, and the "waving" phenomenon is unnoticeable to the user. The quality of the displayed image is therefore improved.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
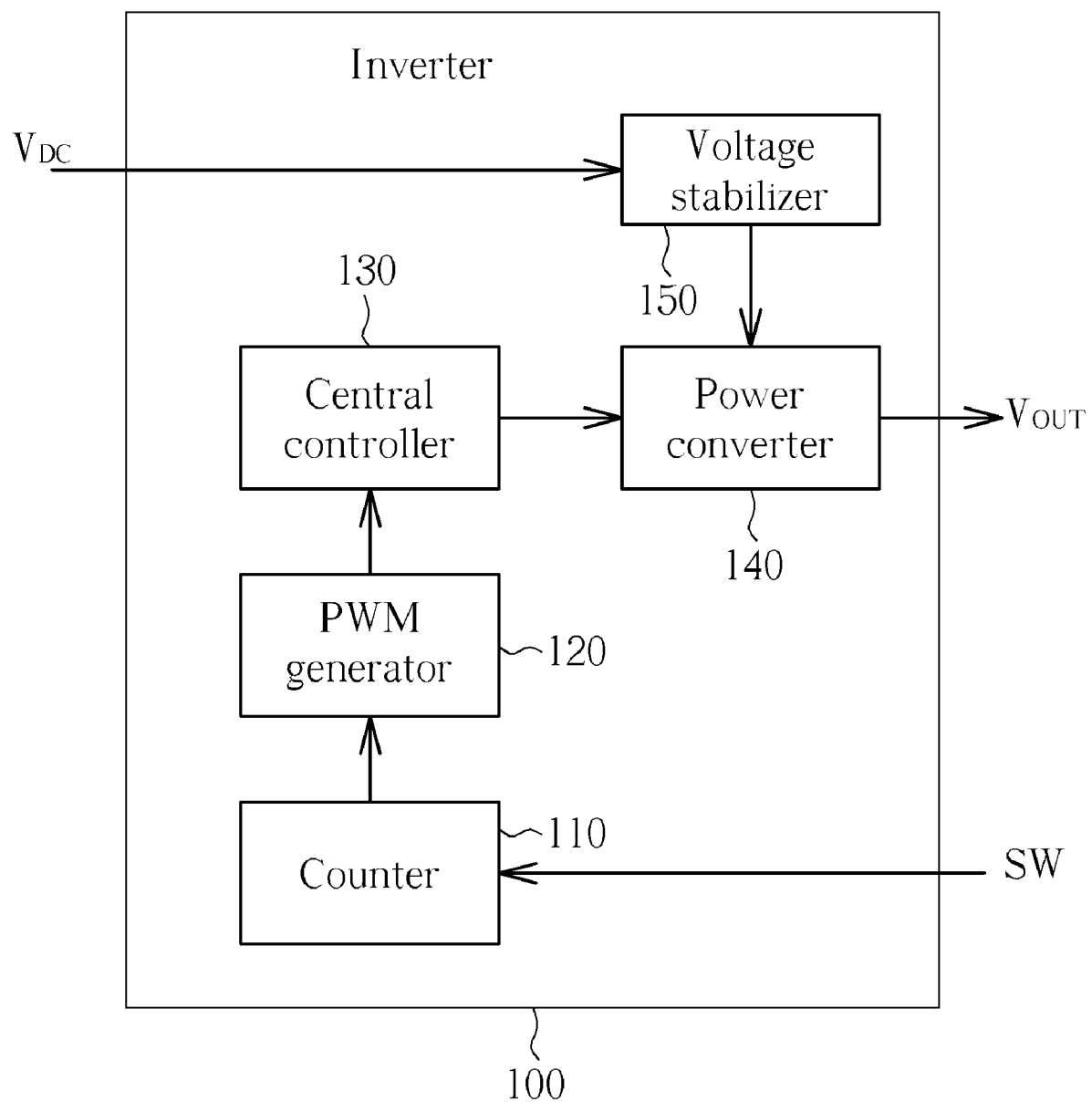
FIG. 1 is a diagram illustrating an inverter according to one embodiment of the present invention.

Please refer to FIG. 1. FIG. 1 is a diagram illustrating an inverter 100 according to one embodiment of the present invention. As shown in FIG. 1, the inverter 100 includes a counter 110, a pulse width modulation (PWM) generator 120, a central controller 130, a power converter 140 and a voltage stabilizer 150.

Figure 2:
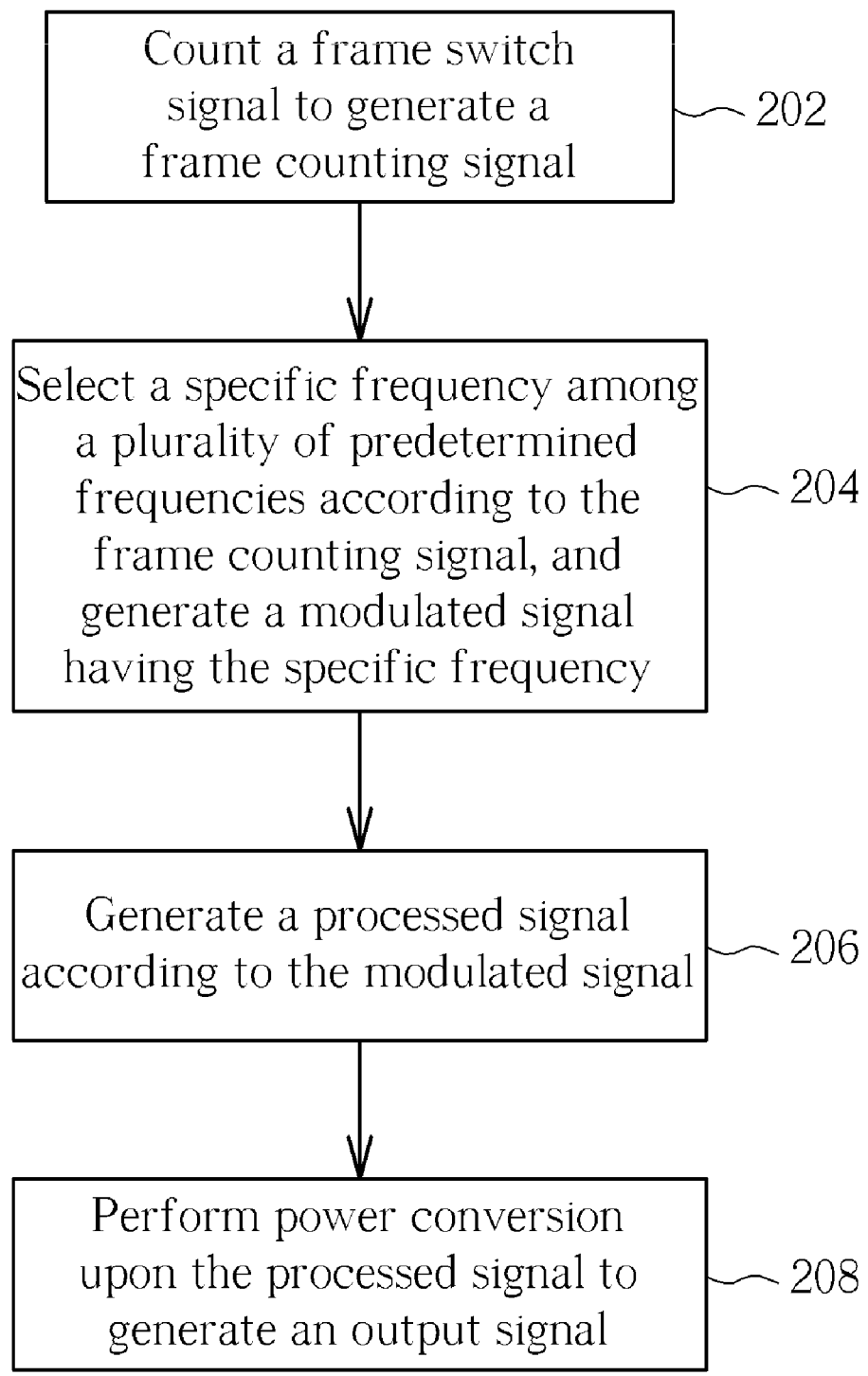
FIG. 2 is a diagram illustrating a flowchart of the inverter shown in FIG. 1.

Please refer to FIG. 1 and FIG. 2 together. FIG. 2 is a diagram illustrating a flowchart of the inverter 100 shown in FIG. 1. Please note that, provided the result is substantially the same, the steps are not limited to be executed according to the exact order shown in FIG. 2. Referring to the flowchart shown in FIG. 2, the operations of the inverter 100 are described as follows:

In Step 202, the counter 110 receives and counts a frame switch signal SW to generate a frame counting signal, where the frame switch signal SW is generated from a control board (not shown) or other circuit when switching from a current frame to a next frame. The frame switch signal SW is also called a start pulse signal. Then, in Step 204, the PWM generator 120 selects a specific frequency among a plurality of predetermined frequencies according to the frame counting signal, and generates a modulated signal having the specific frequency. In Step 206, the central controller 130 generates a processed signal according to the modulated signal, a light-adjusting signal, a voltage-protecting signal, a current control signal etc. Finally, in Step 208, the power converter 140 generates an output signal $V_{OUT}$ according to the processed signal and a voltage-stabilized DC voltage, where the voltage-stabilized DC voltage is generated by a DC voltage $V_{DC}$ processed by the voltage stabilizer 150. The output signal $V_{OUT}$ is a high-voltage AC signal and is used to drive the lamps.

In this embodiment, the plurality of predetermined frequencies are determined from a range of an operating frequency of the inverter 100, where a difference between any two adjacent predetermined frequencies is the same, and the difference is less than 3 KHz. In addition, the PWM generator 120 sequentially and periodically selects the specific frequency among the predetermined frequencies according to the frame counting signal, and the operations of the PWM generator 120 includes a first operating period and a second operating period, where the first and second operating periods are continuous periods. During the first operating period, the frequency (specific frequency) of the modulated signal is sequentially increased until the frequency exceeds a maximum predetermined frequency, and during the second operating period, the frequency (specific frequency) of the modulated signal is sequentially decreased until the frequency drops to a minimum predetermined frequency. An example of the operations of the PWM generator 120 is described as follows:

In one embodiment of the present invention, the range of the operating frequency of the inverter 100 is 59 KHz-67 KHz, and the predetermined frequencies can be respectively determined as 59 KHz, 61 KHz, 63 KHz, 65 KHz, and 67 KHz. In the operations of the inverter 100, when displaying the $1^{st}$ frame, the frequency of the output signal $V_{OUT}$ of the inverter 100 (i.e., the frequency of the modulated signal generated from the PWM generator 120) is 59 KHz; and when displaying the $2^{nd}$ frame, the frequency of the output signal $V_{OUT}$ of the inverter 100 is 61 KHz; when displaying the $3^{rd}$ to $8^{th}$ frames, the frequencies of the output signal $V_{OUT}$ of the inverter 100 are respectively 63 KHz, 65 KHz, 67 KHz, 65 KHz, 63 KHz, and 61 KHz. Then, in the following frames, the above sequence of the frequencies of the output signal $V_{OUT}$ of the inverter 100 when displaying the $1^{st}$ to $8^{th}$ frames are repeated, that is, the above eight frames serve as a period, and the inverter 100 periodically outputs the output signal $V_{OUT}$ having the specific frequency selected from the predetermined frequencies.

It is noted that the above predetermined frequencies are merely for illustrative purposes, and the values and the quantity of the predetermined frequencies can be designed according to the designer's considerations. In addition, the above inverter 100 outputting the output signal $V_{OUT}$ (or the PWM generator 120 outputting the modulated signal) having the specific frequency selected from the predetermined frequencies periodically is merely an example. In practice, the inverter 100 outputs the output signal $V_{OUT}$ (or the PWM generator 120 outputs the modulated signal) having the specific frequency that is randomly selected from the predetermined frequencies. As long as the frequency of the output signal $V_{OUT}$ generated from the inverter 100 varies with the frame counting signal, these alternative designs fall within the scope of the present invention.

Because the positions of the horizontal bands relates to the output frequency of the inverter, if the output frequency of the inverter 100 varies with the frame counting signal, the positions of the horizontal bands corresponding to several sequential frames are different, and the "waving" phenomenon will not be sensed by the user.

Briefly summarizing the inverter and the method for controlling the output frequency of the inverter of the present invention, first, a counter receives a frame switch signal to generate a frame counting signal; then, a PWM generator selects a specific frequency among a plurality of predetermined frequencies according to the frame counting signal, and generates a modulated signal having the specific frequency; then, a central controller generates a processed signal according to the modulated signal; and finally, a power converter generates an output signal according to the processed signal. In addition, the PWM generator selects the specific frequency among the plurality of predetermined frequencies randomly or periodically according to the frame counting signal. To sum up, applying the inverter of the present invention can improve the "waving" phenomenon of the displayed image, and the quality of the displayed image is improved.

Those skilled in the art will readily observe that numerous modifications and alterations of the device and method may be made while retaining the teachings of the invention.

What is claimed is:

1. An inverter, comprising:
    a counter, for receiving a frame switch signal to generate a frame counting signal;
    a pulse width modulation (PWM) generator, coupled to the counter, for selecting a specific frequency among a plurality of predetermined frequencies according to the frame counting signal, and generating a modulated signal having the specific frequency;
    a central controller, coupled to the PWM generator, for generating a processed signal according to the modulated signal; and
    a power converter, coupled to the central controller, for generating an output signal according to the processed signal.

2. The inverter of claim 1, wherein a difference between any two adjacent predetermined frequencies is the same.

3. The inverter of claim 1, wherein a difference between any two adjacent predetermined frequencies is less than 3 KHz.

4. The inverter of claim 1, wherein the PWM generator randomly selects the specific frequency among the plurality of predetermined frequencies according to the frame counting signal.

5. The inverter of claim 1, wherein the PWM generator periodically selects the specific frequency among the plurality of predetermined frequencies according to the frame counting signal.

6. The inverter of claim 5, wherein operations of the PWM generator include a first operating period and a second operating period, and the first and second operating periods are continuous periods; during the first operating period, the specific frequency of the modulated signal is sequentially increased until the specific frequency exceeds a maximum predetermined frequency; and during the second period, the specific frequency of the modulated signal is sequentially decreased until the specific frequency exceeds a minimum predetermined frequency.

7. A method for controlling an output frequency of an inverter, comprising:
    counting a frame switch signal to generate a frame counting signal;
    selecting a specific frequency among a plurality of predetermined frequencies according to the frame counting signal, and generating a modulated signal having the specific frequency;
    generating a processed signal according to the modulated signal; and
    performing power conversion upon the processed signal to generate an output signal.

8. The method of claim 7, wherein a difference between any two adjacent predetermined frequencies is the same.

9. The method of claim 7, wherein a difference between any two adjacent predetermined frequencies is less than 3 KHz.

10. The method of claim 7, wherein the step of selecting the specific frequency among the plurality of predetermined frequencies according to the frame counting signal and generating the modulated signal having the specific frequency comprises:
    randomly selecting the specific frequency among the plurality of predetermined frequencies according to the frame counting signal.

11. The inverter of claim 7, wherein the step of selecting the specific frequency among the plurality of predetermined frequencies according to the frame counting signal and generating the modulated signal having the specific frequency comprises:
    periodically selecting the specific frequency among the plurality of predetermined frequencies according to the frame counting signal.

12. The inverter of claim 11, wherein operations of generating the modulated signal include a first operating period and a second operating period, and the first and second operating periods are continuous periods; during the first operating period, the specific frequency of the modulated signal is sequentially increased until the specific frequency exceeds a maximum predetermined frequency; and during the second period, the specific frequency of the modulated signal is sequentially decreased until the specific frequency exceeds a minimum predetermined frequency.

* * * * *